(No Model.) 3 Sheets—Sheet 2.

T. BLINKHORN & W. S. KEY.
ROUNDABOUT.

No. 371,412. Patented Oct. 11, 1887.

WITNESSES.
J. Henry Taylor,
James F. Bligh.

INVENTOR-
Thomas Blinkhorn
William S. Key
by Alex. P. Browne,
attorney (No Model.) 3 Sheets—Sheet 3.
T. BLINKHORN & W. S. KEY.
ROUNDABOUT.
No. 371,412. Patented Oct. 11, 1887.
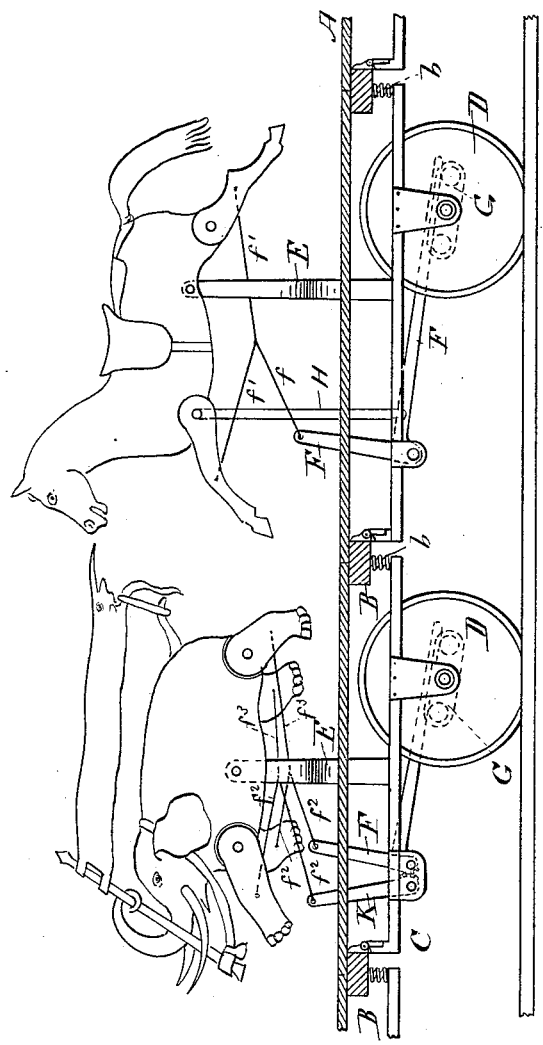
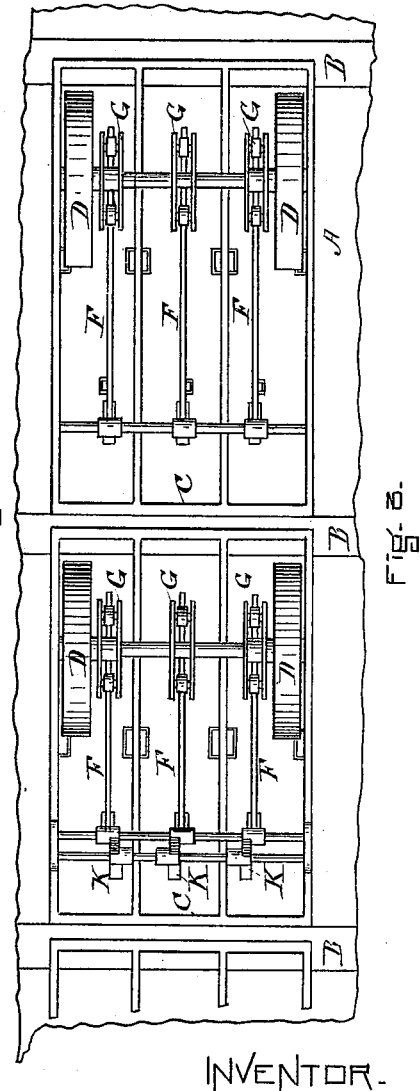
WITNESSES.
J. Henry Taylor.
James T. Bligh.
INVENTOR.
Thomas Blinkhorn
William S. Key
by Alex. P. Browne,
attorney.

UNITED STATES PATENT OFFICE.

THOMAS BLINKHORN AND WILLIAM SIMPSON KEY, OF BOSTON, COUNTY OF LINCOLN, ENGLAND.

ROUNDABOUT.

SPECIFICATION forming part of Letters Patent No. 371,412, dated October 11, 1887.

Application filed June 9, 1886. Serial No. 204,673. (No model.)

*To all whom it may concern:*

Be it known that we, THOMAS BLINKHORN and WILLIAM SIMPSON KEY, both of Boston, in the county of Lincoln, and in the Kingdom of Great Britain, have invented certain new and useful Improvements in Roundabouts, of which the following is a specification.

Our invention relates to improvements in that class of apparatus known as "roundabouts" or "merry-go-rounds," in which figures of animals—such as horses and the like—are caused to move round in a circle, and also have imparted to them motions resembling those of the gait of the animal represented, seats being provided upon the animals upon which persons may ride.

The object of our present invention is to provide improvements in the construction and arrangement of structures of this character. These roundabouts, as ordinarily constructed, consist of a circular wheeled platform running upon suitable circular tracks, and provided with suitable connections, whereby it can be caused to revolve by steam-power or other suitable motor.

Figure 1:
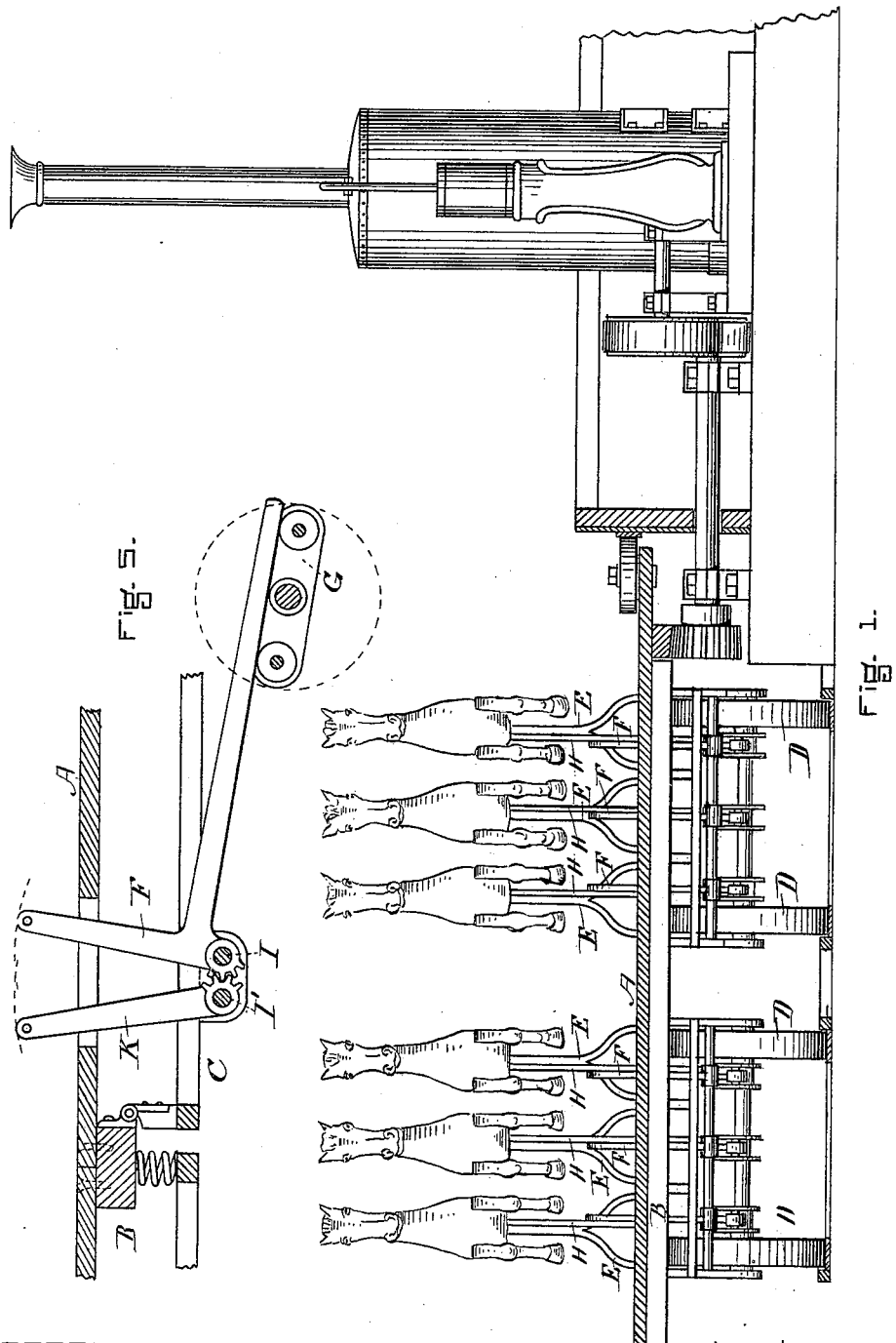
Figure 2:
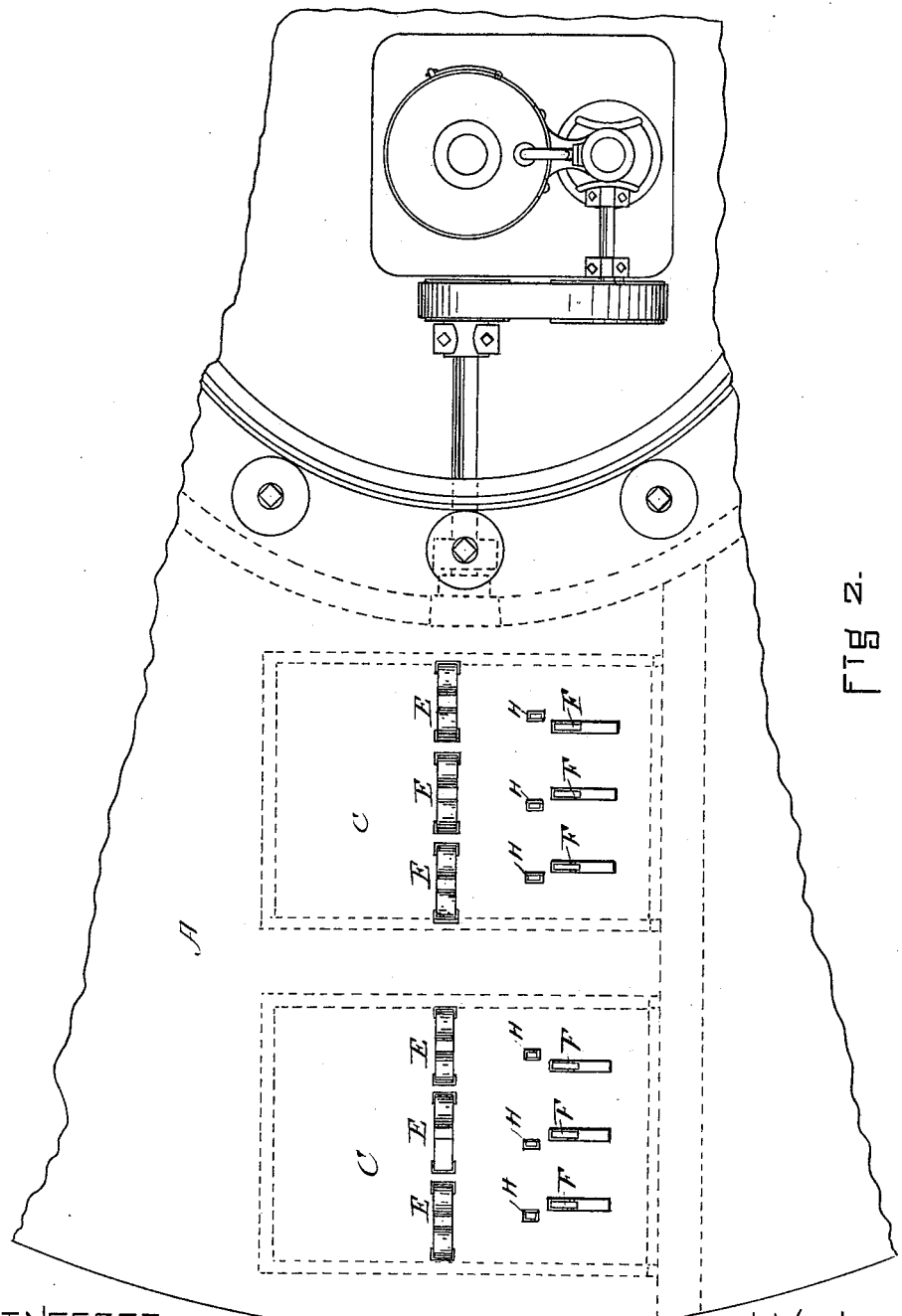

In the accompanying drawings, Figure 1 represents in section and elevation such a motor and platform; Fig. 2, a top plan view of the same; Fig. 3, a plan view from the under side of the devices on which the animals are carried and from which they obtain their motions. Fig. 4 represents in section and side elevation two animals with the devices for giving them the desired motions; and Fig. 5, a detail of a portion of these devices, as will be hereinafter more particularly described.

Heretofore the animals in roundabouts of this character have been mounted upon supplementary platforms hinged to the main revolving platform and flush with the top thereof; but certain objections have been found in practice to this method of construction, to remove which is one object of our present invention. Moreover, we have devised improved appliances for imparting life-like motions to the animals represented.

Our improved roundabout is formed of a circular iron frame-work, preferably made in sections suitably secured together. Upon the top of this iron frame-work we place a board flooring, A. Within this iron frame-work at suitable intervals are placed transverse braces or ties B, (best shown in Figs. 4 and 5,) also of iron, to each of which is pivoted an angle-iron frame, C. The other end of each angle-iron frame C is connected by a spring, *b*, to the brace or tie B immediately behind the one to which it is pivoted, as shown in Fig. 4. These angle-iron frames are also mounted upon a pair of wheels, D, running upon a suitable circular track, as shown in Fig. 1. Upon each frame are placed one, two, or more animals to be ridden, the animals being supported by a standard, E, to which they are pivoted, as shown. Each standard at its base is attached to the angle-iron frame. When so constructed, as will be seen, the upper surface of the platform is left smooth and practically unbroken, and the hinged frames on which the animals are carried are placed below. This construction is an improvement over that in which the hinged frame which carries the animals is made flush with the upper surface of the platform. At the same time the hinged frame insures the wheels D being always in contact with the track, as the hinging permits the frames to move up and down, and thus accommodate themselves to any inequalities in the track or rails.

For imparting the desired motions to the bodies and legs of the animals, we provide an elbow-lever, F, pivoted on the frame C. One arm of this lever rests upon a double cam, G, connected with the axis of the wheels D D and rotating with them. An enlarged view of this is shown at Fig. 5. To the other end of the elbow-lever is pivoted a connecting-rod, *f*, which in turn is pivoted to a pair of connecting-rods, *f' f'*, attached, respectively, to the fore and hind legs of an animal, which are pivoted to its body, as shown in Fig. 4. The fore legs are fast to the same shaft or pivot and move together, and the same is true of the hind legs. The forward part of the body of the animal is also connected to the lower arm of the lever F by means of a connecting-rod, H, pivotally connected to both, as shown. By means of this combination of parts the revolution of the wheels D, rotating the cams G and raising and lowering the lower end of the elbow-lever F, imparts a forward and backward motion to the upper end, which motion is transmitted to the legs of the animals, and thereby causes them to move as if in galloping, while by means of the connecting-rod H the body of the animal is caused to rise and fall to correspond with the same motion.

When it is desired to impart a walking or trotting motion to the legs of the animal, each leg is pivoted independently, and at the fulcrum of the elbow-lever F is placed a spur-gear, I, which engages with a similar spur-gear, I', (see Fig. 5,) upon the fulcrum of a second lever or rocker-arm, K, the construction being as shown in detail in Fig. 5. From the end of the upper part of the lever F, as well as from that of the rocker-arm, connecting-rods $f^2$ extend, which are themselves connected with other connecting-rods $f^3$, connected to one hind and the opposite fore leg of the animal, respectively. By this combination of parts a motion is imparted to the legs of the animal which represents a walk or trot.

We claim—

1. In a roundabout, the combination, with figures of animals, as described, of the upper platform, A, hinged platform C, wheels D, secured thereto, figures of animals supported on platform C by means of standards E, braces B B, and springs $b$, all substantially as set forth.

2. In a roundabout, the combination, with the upper platform, A, hinged platform C, figures of animals supported thereon by supports E, the wheels D, double cam G, elbow-lever F, and connecting-rods $ff'$, respectively attached to and operating the pivoted fore and hind legs of said animals, all substantially as set forth.

3. In a roundabout, the combination, with figures of animals, as described, the upper platform, A, main wheeled platform, and hinged platform C, having the figure of an animal supported thereon by a suitable support, E, of the wheels D, double cam G, elbow-lever F, rocker-arm K, and connecting-rods $f^2 f^3$, connected, respectively, to one hind and the opposite fore leg of the said animal, all substantially as described, and for the purposes herein set forth.

In testimony whereof we have hereunto subscribed our names this 9th day of October, A. D. 1885.

THOMAS BLINKHORN.
WILLIAM SIMPSON KEY.

Witnesses:
FRANCIS THOMAS SELBY,
GEORGE WILLIAM BAILEY.